Nov. 21, 1950         S. W. SHELLEY         2,530,405
MOVING COMB TYPE COTTON HARVESTER
Filed May 13, 1947         9 Sheets-Sheet 1
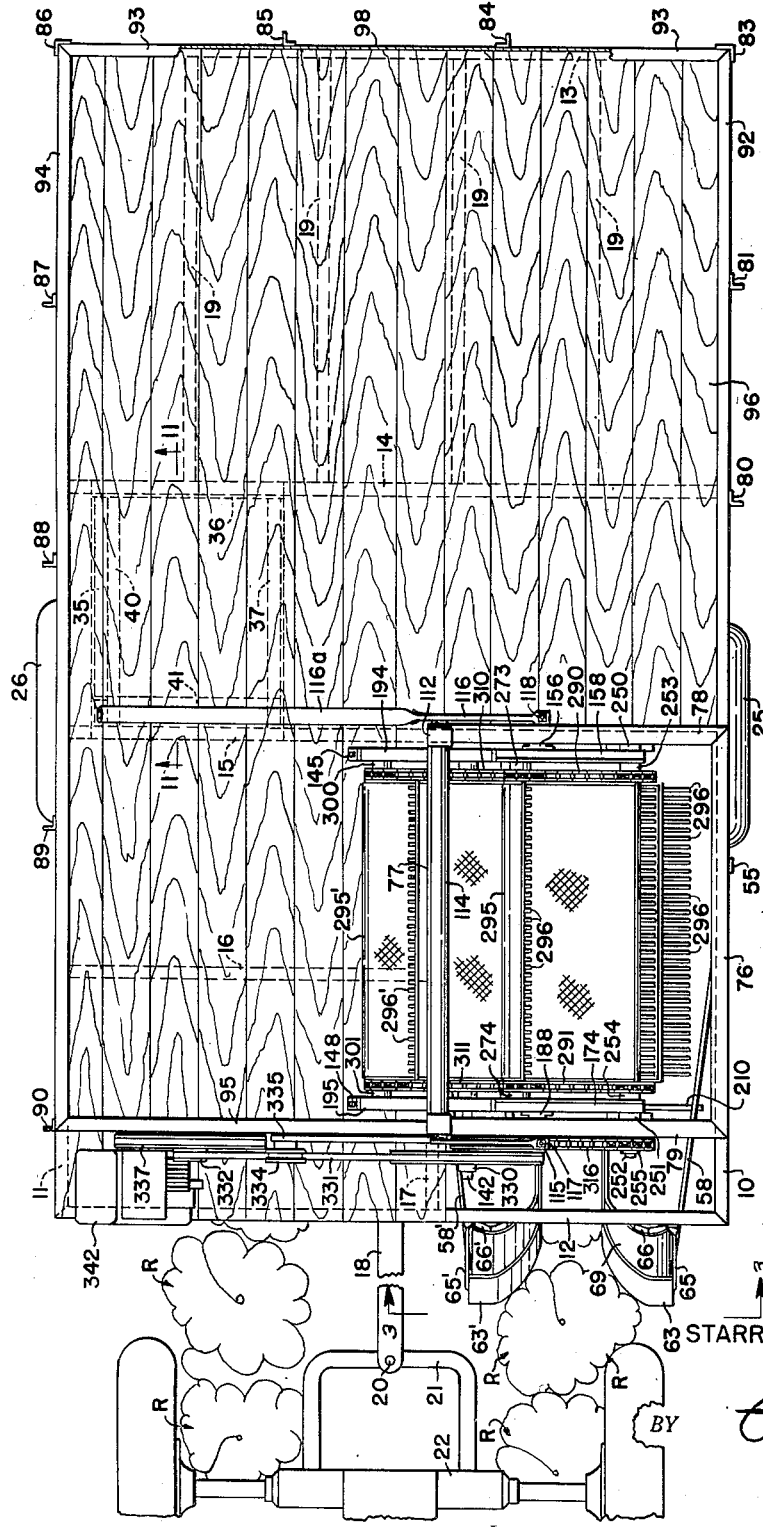
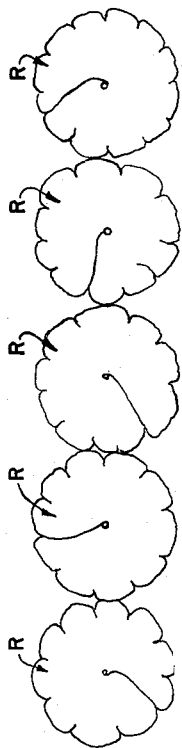
FIG. - 1
STARR W. SHELLEY,
*INVENTOR.*
BY *Paul B Eaton*
ATTORNEY.

Nov. 21, 1950 S. W. SHELLEY 2,530,405
MOVING COMB TYPE COTTON HARVESTER
Filed May 13, 1947 9 Sheets-Sheet 3

STARR W. SHELLEY,
INVENTOR.

BY

ATTORNEY.

Nov. 21, 1950 S. W. SHELLEY 2,530,405
MOVING COMB TYPE COTTON HARVESTER
Filed May 13, 1947 9 Sheets-Sheet 7

STARR W. SHELLEY,
*INVENTOR.*

BY

*ATTORNEY.*

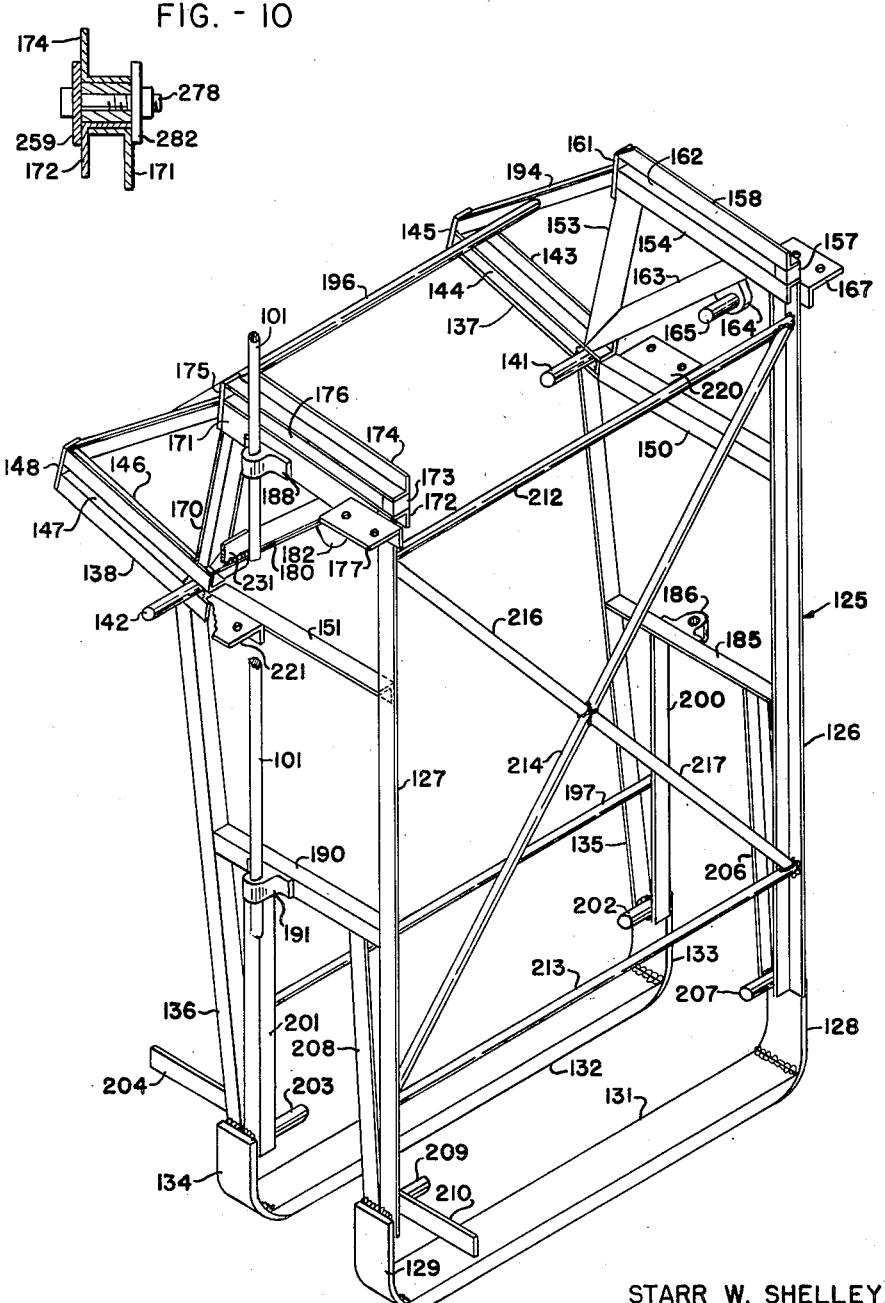

Nov. 21, 1950

S. W. SHELLEY 2,530,405

MOVING COMB TYPE COTTON HARVESTER

Filed May 13, 1947

STARR W. SHELLEY, INVENTOR.

BY

ATTORNEY.

Patented Nov. 21, 1950

2,530,405

UNITED STATES PATENT OFFICE 2,530,405

MOVING COMB TYPE COTTON HARVESTER

Starr W. Shelley, Charlotte, N. C., assignor to L & S Manufacturing Co., Charlotte, N. C., a corporation of North Carolina Application May 13, 1947, Serial No. 747,639

7 Claims. (Cl. 56—35)

This invention relates to a cotton picking apparatus and more especially to a machine adapted to be pulled by a suitable tractor over a field of cotton and has mechanism for straddling a row of cotton plants and is adapted to remove from the cotton plants the bolls with the cotton contained therein.

Heretofore various attempts have been made to provide a cotton picker providing fingers or suction means for removing the fibers from the bolls. Such attempts have been in many cases unsuccessful due to the fact that the fingers or the suction means would remove bits of the bolls and cotton leaves, stems of the cotton plant and the like. It is a purpose of this invention to remove the entire bolls from the stalk.

It is therefore an object of this invention to provide a machine adapted to be pulled over a row of cotton plants and having a pair of endless chain mechanisms provided with tines projecting inwardly towards each other to engage the cotton bolls and to separate the same from the cotton plants by tearing the stems loose from the bolls or breaking the stems or tearing the stems away from the cotton plant and these separated bolls are raised upwardly by the tines and conveyed laterally and dumped into a suitable bin or compartment contained on the apparatus and when the compartment is filled with the cotton bolls, the same may be removed and transported to the stationary apparatus for further processing in the mechanism as disclosed in said above recited patent application.

It is another object of this invention to provide a machine having means for engaging the bolls on cotton plants as it travels along a row of cotton plants and separating the bolls from the cotton plants and elevating the same and dumping the same into a suitable compartment carried by the framework of the machine.

Some of the objects of the invention having been stated, other objects will appear as the description proceeds when taken in connection with the accompanying drawings, in which Figure 1 is a top plan view of the apparatus;

Figure 9 is an isometric view of the frame of the boll collecting apparatus removed from the body framework and omitting the conveying means;

Figure 10 is a vertical sectional view showing a part of the conveyor chain take-up means and being taken along the line 10—10 in Figure 3;

Figure 2:
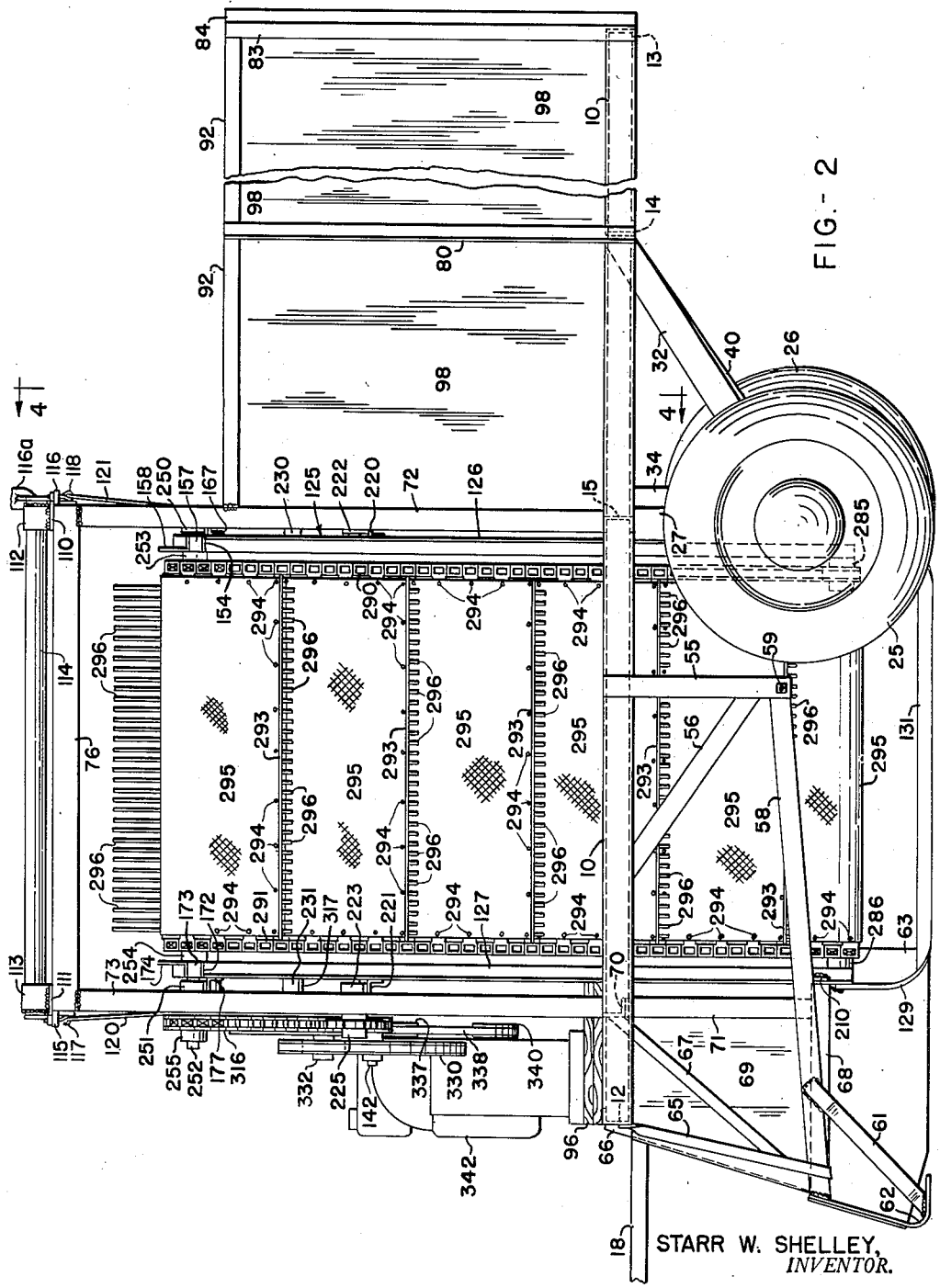
Figure 2 is a side elevation looking from the lower side of Figure 1.

Referring more specifically to the drawings, the numerals 10 and 11 indicate the side frame members of the apparatus which have secured between their front ends a connecting bar 12 and a rear cross bar 13 and intermediate cross bars 14, 15 and 16. The intermediate cross-bar 16 does not extend all the way across the machine but is connected to a longitudinally extending bar 17 having its ends joined to the front bar 12 and the intermediate cross bar 15. Extending between the back bar 13 and intermediate cross bar 14 is a plurality of longitudinally extending bars 19. The main frame of the apparatus is adapted to be pulled by a suitable prime mover such as a tractor and the front cross bar 12 has welded to and projecting therefrom a draw bar 18 which is adapted to be pivotally connected as at 20 to a draw bar 21 of a tractor 22. The main frame just described is supported on suitable wheels 25 and 26. The wheel 25 is supported by means of a downwardly projecting bar 27 welded at its upper end to intermediate cross bar 15 and at its lower end to the vertically disposed bar 27. The vertically disposed bar 27 is also braced by an angularly disposed bar 32 welded at its lower end to the vertically disposed bar 27 and at its upper end to the intermediate cross bar 14. The other wheel 26 is supported by a vertically disposed bar 34 welded at its upper end to a bar 35 of a rectangular framework comprising not only bar 35 but bars 36, 37, 38 and 39. The vertically disposed bar 34 is braced by a bar 40 welded at its lower end to the vertically disposed bar 34 and at its upper end to the bar 36. The vertically disposed bar 34 is also braced by an angularly disposed bar 41 welded at its lower end to the bar 34 and at its upper end to the bars 37 and 38. It is necessary that the position of wheel 26 be adjustable relative to the wheel 25 and therefore the bars 14 and 15 are slotted as at 43 and 44 through which bolts 45 and 46 are passed and which penetrate the bars 36 and 38. The cross members 14 and 15 have welded thereto a plurality of L-shaped clips 50 and 51 respectively which project downwardly and beneath the bars 36 and 38 and thus prevent downward movement of the wheel 26 when the adjusting bolts 45 and 46 are loosened to adjust the wheel 26 and its framework laterally with respect to the wheel 25.

By referring to Figure 2, it is seen that on the left-hand side of the machine there is secured to the side bar 10 a downwardly projecting bar 55 which is braced by a brace bar 56. There is also secured to the side bar 10 a downwardly projecting bar 57 and the lower end of the bracing bar 56 is secured near the lower end of the bars 55 and 57. Secured at the lower end of the bar 55 is a forwardly projecting bar 58 by means of a suitable pivot bolt 59. Near the front end of bar 58 there is secured the upper end of a downwardly and forwardly projecting bar 61 whose lower end is secured to a back-turned shoe portion 62 of a bar which projects upwardly and is welded to the front end of bar 58. The uprising portion of shoe member 62 has secured thereto a shield member 63 which projects inwardly and backwardly.

In order to support the free end of bar 58 there is a bar 65 welded to the front surface of frame member 12 which projects downwardly and is turned inwardly beneath the bar 58 and has its ends welded to the lower end of an angle bar 66 whose upper end is welded to the front cross bar 12 and whose lower end is supported by a brace bar 67 which projects upwardly and rearwardly to a horizontally disposed angle bar 70. Fastened at its front end to the lower end of angle bar 66 is a rearwardly extending bar 68 and there is a fixed shield 69 secured at its lower end to the bar 68 and the shield 69 is supported at its front end by being secured to the angle bar 66. Also secured to the lower surface of the horizontally disposed bar 70, which is secured between side bar 10 and intermediate bar 17, is a vertically disposed bar 71 which at its lower end is welded to the horizontally projecting bar 68 to thus form a support for the stationary sheet metal member 69.

Figure 3:
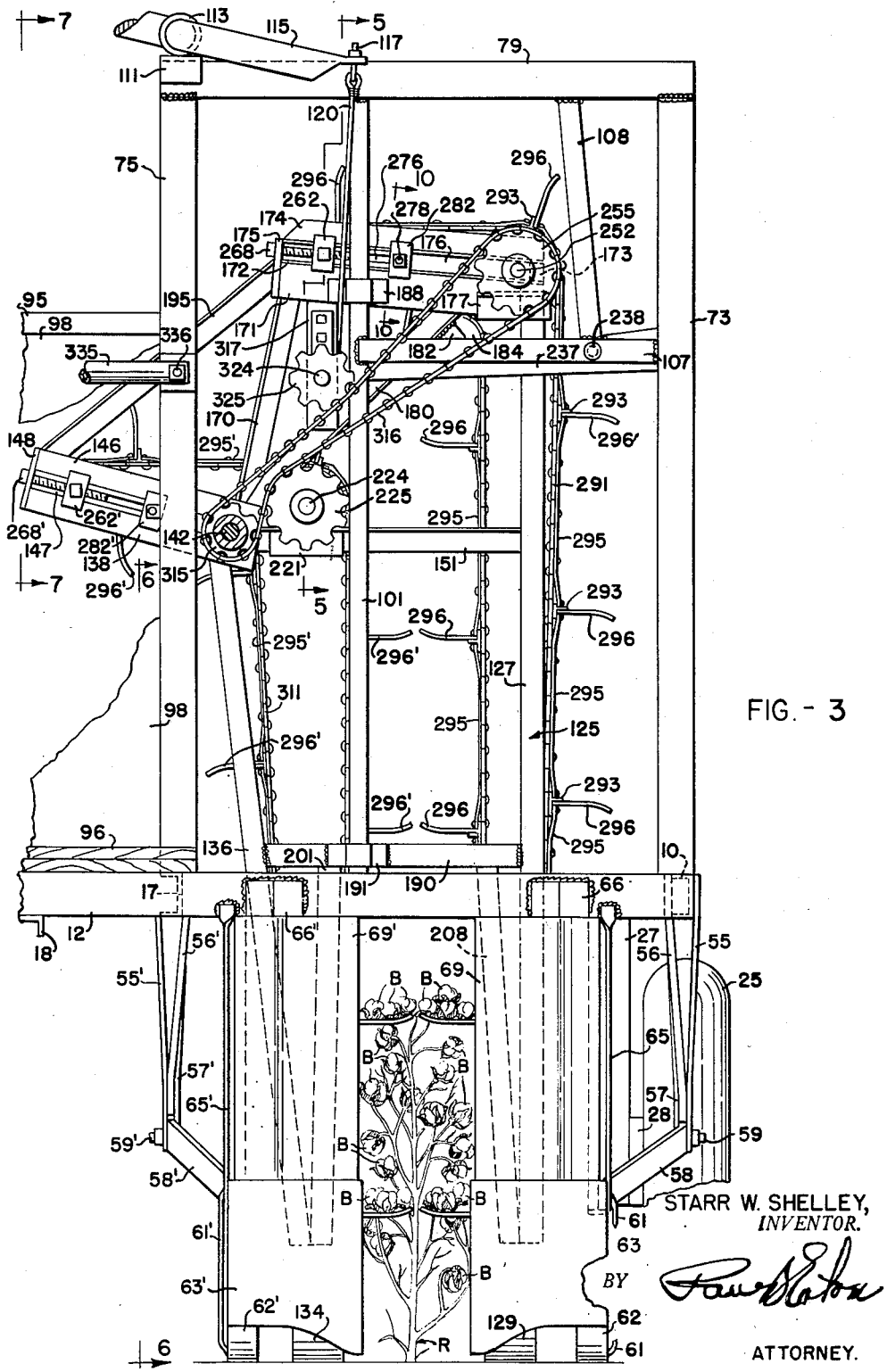
Figure 3 is a front elevation with parts broken away and showing the hub of one of the driving pulleys in cross-section and looking substantially along the line 3—3 in Figure 1.

The description given for the right-hand side of the machine for the parts beginning with reference character 55 and ending with reference character 71 equally applies to the left-hand side of the machine and like reference characters will apply, except that these parts are secured to the bar 17 and other associated bars already described, and the prime notation will be added to the parts on the left-hand side of the machine in Figure 3.

For accommodating the boll picking apparatus, a suitable superstructure, or framework, rises from the main frame. There are two vertically disposed angle bars 72 and 73 which have their lower ends welded to the side bar 10. Also, there are two upright angle bars 74 and 75 which have their lower ends welded to the cross bar 15 and to longitudinally extending bar 17 respectively. At the upper ends of bars 72 and 73 a longitudinally extending top angle bar 76 is secured and to the top ends of vertically disposed bars 74 and 75 is secured a longitudinally extending angle bar 77. To the top of bars 72 and 73 is secured a cross angle 78 and to the top ends of vertically disposed angle bars 73 and 75 is secured a horizontally disposed angle bar 79.

Secured at their lower ends to the channel bar 10 are upright bars 80 and 81 (see Figure 1) and at the junction point of rear bar 13 and side bar 10 is secured an upright angle bar 83. Secured at their lower ends to the rear transverse channel bar 13 are upright angle bars 84 and 85. Secured at the junction point of the rear cross channel bar 13 and longitudinally extending side bar 11 is a corner angle bar 86. Secured at their lower ends to the side channel bar 11 are the upright angle bars 87, 88, 89, and 90. Secured to the upright angle bar 72 at its front end, and to the top ends of angle bars 80, 81 and corner bar 83 is an angle bar 92 (see Figure 2) and secured to the upper end of upright angle bars 84 and 85 and to the corner bars 83 and 86 is an upper angle bar 93. Secured to the upper end of corner angle bar 86 and to the upright angle bars 87, 88, 89 and 90 is a horizontally extending upper angle bar 94. Secured to the upright bar 75 and corner upright bar 90 is an upper angle bar 95. Secured on the inside of the vertical posts 80 to 90 inclusive, bar 97 and to vertical bars 72 and 75 are wall panels 98. This forms the framework of the bed or bin into which the cotton bolls are adapted to be dumped by the picker and elevating means to be later described.

Secured on top of the side bars 10 and 11 and the rear and front cross bars 12 and 13 and to the cross bars 14, 15, and 16 and to the longitudinally extending bars 17 and 19 is a floor 96 made of any suitable material such as board, plank and the like. Secured at its lower end on top of the floor 96 is an angle bar 97 whose upper end is welded or otherwise secured to the upper horizontal cross bar 95.

Figure 6:
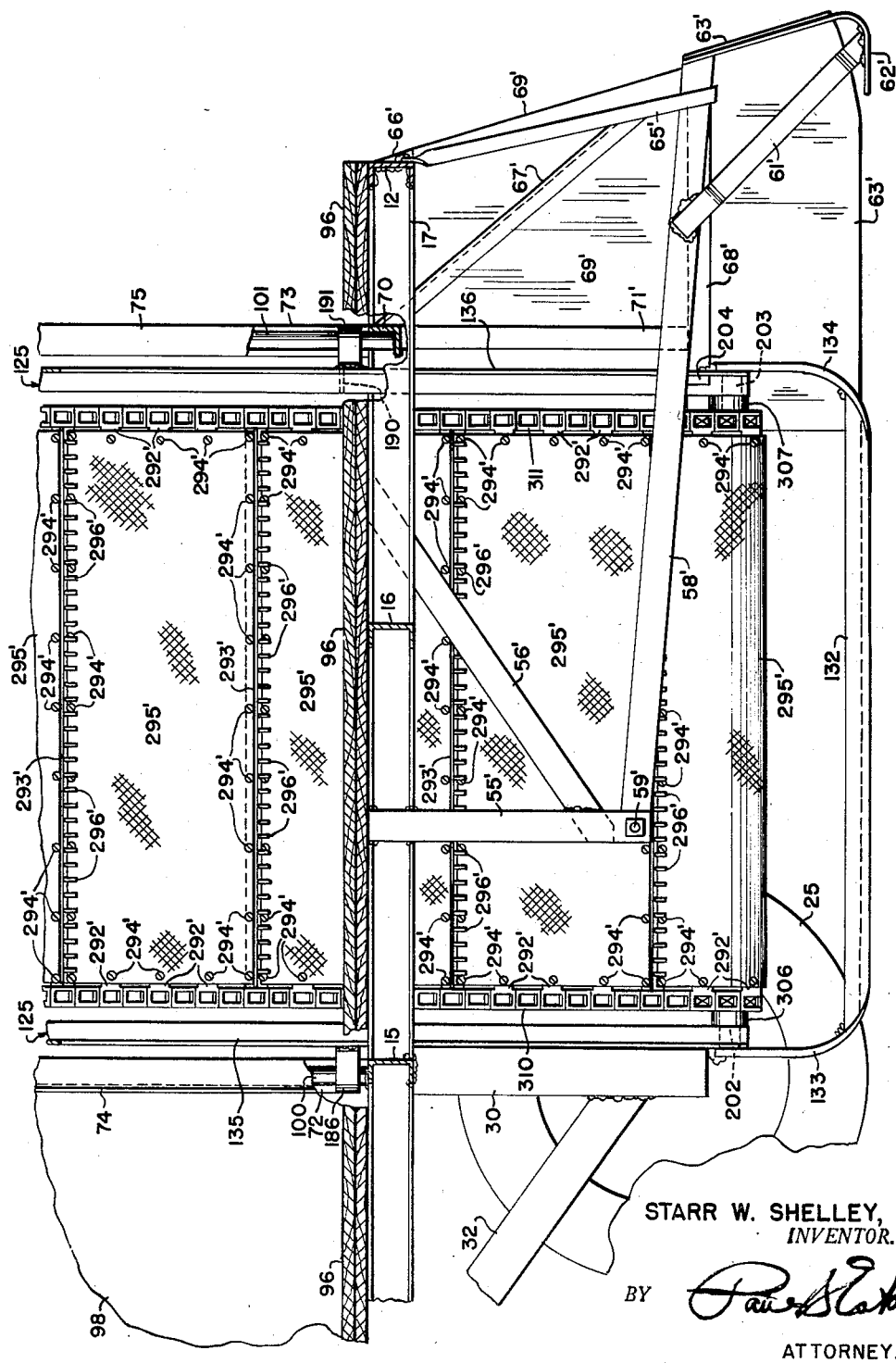
Figure 6 is an elevation of the lower left-hand side of the machine showing portions of the machine as viewed from the top side of Figure 1 which traverses the row of cotton plants and omitting the upper front portion of the apparatus as shown in Figure 1, and being taken substantially along the line 6—6 in Figure 3.

The upwardly projecting frame accommodating the vertically movable frame which has the sprocket chains and tines therein and which will be later described, not only comprises the corner posts 72, 73, 74 and 75 but also comprises two vertically disposed shafts 100 and 101 which are welded at their top ends to the top cross bars 76 and 77 respectively. The shaft 101 is welded at its lower end to the lower cross bar 70 and the vertically disposed shaft 100 is welded to the cross bar 15 at its lower end (see Figure 6).

The main frame for supporting the boll picking apparatus not only comprises the vertically disposed bars 72, 73, 74 and 75 as well as the other bars and structure heretofore described, but there is also provided a horizontally disposed strap iron member 105 which is welded at one end to the upright bar 72 and at its other end to the vertically disposed shaft 100.

There is also a strap iron member 106 welded at its upper end to top cross bar 17 and at its lower end to an intermediate portion of bar 105. See Figure 4.

Between vertically disposed shaft 101 and vertically disposed bar 73 is secured a strap iron member 107 by being welded at one end to upright bar 73 and at its other end to shaft 101. There is also a strap iron member 108 welded at its upper end to cross bar 79 and to an intermediate portion of strap iron member 107. See Figure 3.

Figure 4:
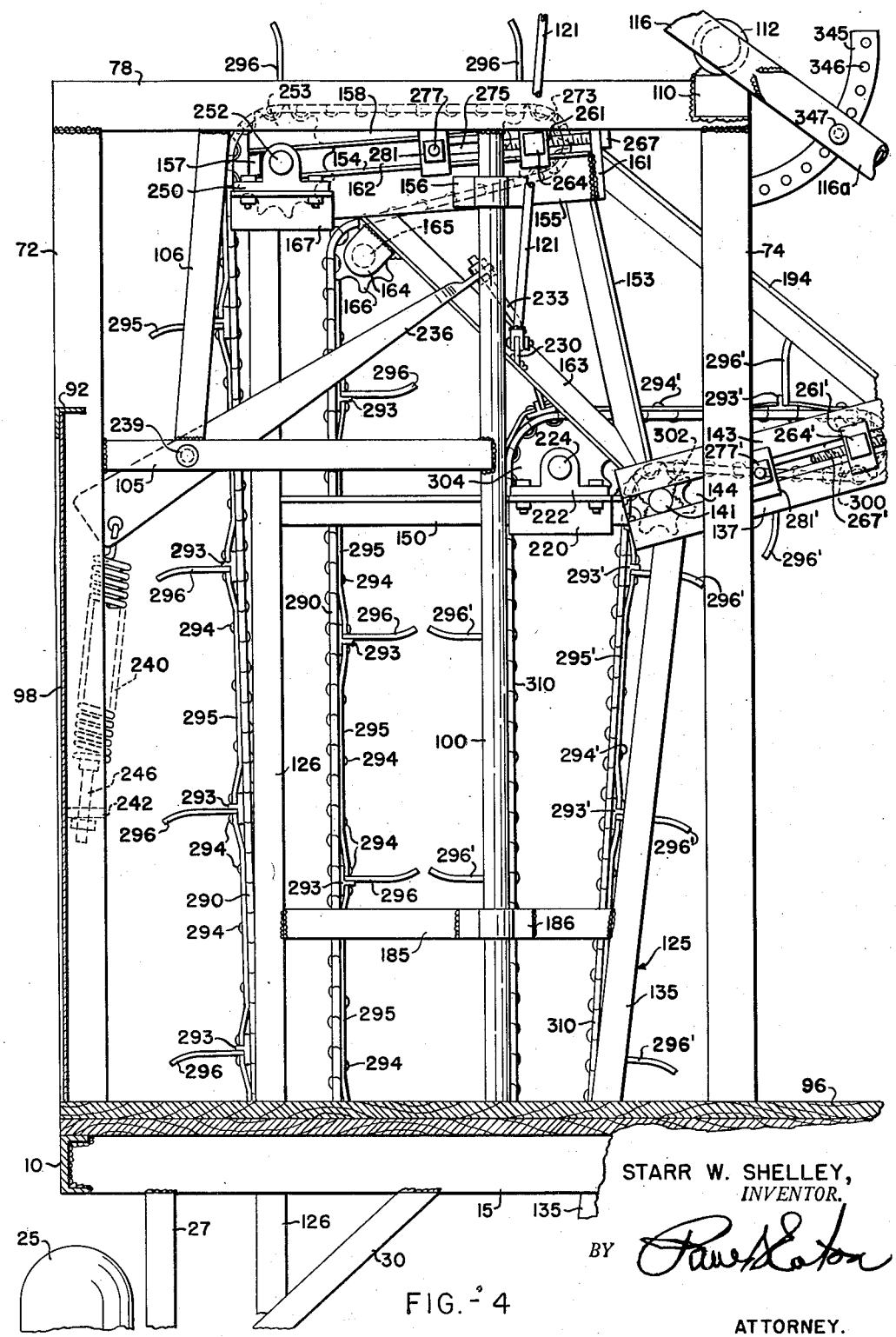
Figure 4 is a rear elevation of the upper portion of the apparatus or a reverse view from that shown in Figure 3, but showing the boll collecting apparatus in elevated position from that shown in Figure 3 and being taken along the line 4—4 in Figure 2.

Welded to one end of upper cross bars 78 and 79 and more clearly shown in Figures 3 and 4 are suitable angle brackets 110 and 111 respectively which have welded thereto suitable bearings 112 and 113 respectively. In these bearings 112 and 113 is oscillatably mounted a shaft 114 having welded at one end thereof a lever 115 and to the other end thereof is welded a lever 116. The lever 116 has a laterally projecting handle portion 116a integral therewith which can be manipulated for oscillating the shaft 114. To the free end of the levers 115 and 116 are secured eye bolts 117 and 118 respectively and these eye bolts 117 and 118 have secured therein the upper ends of suitable cables or links 120 and 121 respectively, the lower ends of which are connected to a vertically movable frame to be presently described.

The vertically movable frame for accommodating the endless conveyors having tines thereon for removing the cotton bolls from the stalks is designated broadly at 125. See Figure 9. This frame 125 comprises a pair of vertically disposed angle bars 126 and 127 which have secured to their lower ends curved strap members 128 and 129 respectively. Welded to the proximate surfaces of these members 128 and 129, and extending therebetween is a shoe or skid member 131. There is also provided a companion skid member 132 which has at its two ends curved members 133 and 134, respectively. These project upwardly and are welded to the remote surfaces of angularly disposed angle bars 135 and 136. These bars 135 and 136 extend upwardly and are inclined away from the vertically disposed angle bars 126 and 127.

Welded to the upper ends of angle bars 135 and 136 are upwardly and outwardly extending angle bars 137 and 138 respectively. Welded to the top surface of angle bar 137 is a stub shaft 141 and welded to the top surface of angle bar 137 is a stub shaft 142. Welded to the top surface of shaft 141 is another angle bar 143 which extends outwardly and upwardly in parallel relation to angle bar 137, thus providing a slot 144 between the angle bars 137 and 143. The outer ends of angle bars 137 and 143 have welded thereto a strap iron member 145.

Welded to the top surface of stub shaft 142 is an angle bar 146 which extends outwardly and upwardly in parallel relation to angle bar 138, thus forming a slot 147. The outer ends of angle bars 138 and 146 have welded thereto a strap iron member 148. Welded to the inner ends of angle bars 137 and 143 is one end of an angle bar 150, whose other end is welded to the inner surface of upright angle bar 126. Also welded to the inner ends of angle bars 138 and 146 is an angle bar 151 whose other end is welded to the inside surface of vertically disposed angle bar 127.

Welded to the top surface of angle bar 143 is an angle bar 153 whose other end is welded to a horizontally disposed angle bar 154. The other end of angle bar 154 is welded to the top end of vertically disposed angle bar 126. Welded to the lower surface of the horizontal web of angle bar 154 is another angle bar 155 (see Fig. 5), and to the vertical web of angle bar 155 is secured a bearing 156 which is slidably penetrated by vertical shaft 100. Welded on top of the end of angle bar 154 nearest the observer in Figure 9 is a spacing block 157 which has welded thereto one end of an angle bar 158 whose other end is welded to a spacing strap 161 which is likewise welded to the rear end of angle bar 154 as viewed in Figure 9. This provides a slot 162 between the angle bars 154 and 158, the purpose of which will be later described.

Welded on the outside of vertically disposed angle bar 126 is a small angle piece 167 which serves as a perch for a driving shaft, to be later decsribed. Welded to the angle bars 154 and 155 is an angularly disposed angle bar 163 whose lower end is welded to the lower end of angle bar 153 and to angle bar 143. This angle bar 163 has a bearing 164 on its lower surface in which is fixedly mounted a stub shaft 165 on which is rotatably mounted an idler sprocket 166.

Welded to the top surface of angle bar 146 is an angle bar 170 which projects upwardly and which has welded to the upper end thereof a horizontally disposed angle bar 171 and this in turn has welded on top thereof an angle bar 172. Welded on top of one end of angle bar 172 is a spacing block 173 which has welded thereto one end of an angle bar 174. The other ends of bars 171, 172 and 174 have welded thereto a strap iron member 175 which holds the bar 174 in spaced relation to the upper surface of an angle bar 172, thus providing a slot 176 similar to slot 162. Welded on the outside of angle bar 171 is an angle clip 177 similar to angle clip 167 at the other side of the frame 125. Welded to the lower surface of the horizontal leg of angle bar 171. This angle bar 180 has a bearing block 182 welded thereto in which is welded a stub shaft 183 on which is rotatably mounted an idler sprocket wheel 184. See Figure 5. Disposed between the bars 126 and 135 is an angle bar 185 on which is fixedly mounted a bearing block 186 adapted to slidably receive the shaft 100. The angle bar 155 has the bearing 156, already described, secured on its outer surface which cooperates with the bearing block 186 and which is identical to a bearing block 188 fixed on the angle bar 171 which is adapted to slidably receive the vertical shaft 101. Disposed between and having its ends welded to the angle bars 127 and 136 is an angle bar 190 which has a bearing 191 on its exterior surface which is also adapted to slidably receive the shaft 101.

Welded at one end to plate 161 is an angle bar 194 whose other end is welded to the plate 145 and welded to plate 175 is one end of an angle bar 195 whose other end is welded to plate 148. Disposed between and welded to the proximate horizontal legs of angle bars 194 and 195 is a pipe or shaft 196. A horizontal pipe or shaft 197 is secured between upright angles 200 and 201, the upper ends of which are welded respectively to the angle bars 185 and 190, and the lower ends of which are welded to the angle bars 135 and 136 and to the curved plate members 133 and 134.

Stub idler shafts 202 and 203 are welded between the lower ends of angle bars 200 and 135, and 201 and 136, respectively. Welded to the lower portion of angle bar 136 and projecting outwardly therefrom is a strap iron member 204 which passes under and engages the bar 58' to raise the same when the frame 125 is caused to raise. A vertically disposed angle bar 206 is welded at its upper end to angle bar 185 and projects downwardly and is welded to a stub shaft 207 which stub shaft is also welded to the lower portion of angle bar 126. Welded to the curved plate member 129 is the lower end of an angle bar 208 whose upper end is welded to horizontal angle bar 190. Welded to one leg of angle bar 127 at its lower end is an outwardly projecting strap iron member 210 which passes under and engages the bar 58 and causes the same to raise when the frame 125 is caused to raise. Between the angle bar 208 and angle bar 127 is welded a stub shaft 209.

The vertical angle bars 126 and 127 have welded therebetween horizontally disposed pipes or shafts 212 and 213. A diagonally disposed pipe or shaft 214 has its ends welded at the junction point of shaft 212 and angle bar 126 at one end and has its other end welded at the junction point of vertical angle bar 127 and shaft or pipe 213. A pair of short pipes 216 and 217 are welded between the ends of pipe or shaft 212 and 213 respectively and the shaft or pipe 214 to form a diagonal brace in addition to the diagonal brace 214. The horizontal angle bar 150 has welded thereto an angle clip 220 while angle bar 151 has welded thereto an angle clip 221. The angle clips 220 and 221 have mounted thereon bearing blocks 222 and 223 in which is rotatably mounted a shaft 224 which has mounted on the front end thereof a sprocket wheel 225. See Figure 5.

In order to suspend the frame 125 for vertical movement within the main frame comprising vertical angle bars 72, 73, 74 and 75, it is to be noted that the levers 115 and 116 with their eye bolts 117 and 118 therein have downwardly projecting links 120 and 121. These links 120 and 121 project downwardly and are secured to outwardly projecting members 230 and 231 which are welded to the diagonal angle bars 163 and 180 respectively. Also secured to the members 230 and 231 are short cables 233 and 234 whose upper ends are secured to levers 236 and 237 which are pivoted intermediate their ends as at 238 and 239 and the horizontally disposed angles 105 and 107. The other ends of the levers 236 and 237 have secured thereto one end of tension springs 240 and 241 respectively whose lower ends are secured to projections 242 and 243 projecting from the proximate sides of the vertically disposed angle bars 72 and 73. The manner of securing the lower ends of the springs 240 and 241 to the projections 242 and 243 comprises threaded bolts 246 and 247 whereby the tension in the springs 240 and 241 can be adjusted. This mechanism just described provides a counterbalance for supporting some but not all of the weight of the vertically movable frame 125 and assists in lifting the frame 125 by means of the lever 116a.

Angle brackets 167 and 177 respectively have bearing blocks 250 and 251 secured on their upper surfaces in which is rotatably mounted a shaft 252 which has sprockets 253, 254 and 255 mounted on the ends thereof. See Figures 3 and 4. It will be observed that the angle bars 154 and 158 have a slot 162 therebetween and also angle bars 172 and 174 have a slot 176 therebetween. Slidably mounted in the slots 162 and 176 respectively are blocks 256 and 257 (see Figure 5) which have plates 258 and 259 welded to their proximate ends and which fit flush against angle bars 154 and 158 and angle bars 172 and 174 respectively. The outer ends of these blocks 256 and 257 have plates 261 and 262 respectively fitting thereagainst and the outer ends of these blocks 256 and 257 have a threaded bore therein and suitable screws 264 and 265 penetrate these plates and thus slidably secure the blocks 256 and 257 for sliding movement in the slots 162 and 176 respectively. The blocks 256 and 257 are threadably penetrated by bolts 267 and 268 which slidably penetrate the plates 161 and 175 respectively. The plates 258 and 259 have welded thereto one end of stub shaft 271 and 272 on which idler sprockets 273 and 274 are rotatably mounted. The bearing blocks 256 and 257 extend along the slots 162 and 176 respectively and are slotted as at 275 and 276 respectively, and these slots are penetrated by suitable bolts 277 and 278 respectively which penetrate plates 281 and 258 and plates 259 and 282 respectively whereby the bolts 277 and 278 can be tightened to clamp the bearing blocks 256 and 257 in adjusted position. See Figures 3, 4 and 10.

Rotatably mounted on the stub shafts 207 and 208 shown in Figure 9 are two idler sprockets 285 and 286 shown in Figure 2. Mounted on the sprocket wheels 253, 273, 166 and 285 is a sprocket chain 290 and mounted on the sprocket wheels near the front of the machine indicated at 254, 274, 184 and 286 is a sprocket chain 291. Certain spaced links, shown in the drawings as being every other link of the two sprocket chains 290 and 291, have inturned ears 292 integral therewith. To certain spaced lugs 292 of the sprocket chains 290 and 291 are welded cross bars 293 and all of the lugs 292 have secured thereto by suitable bolts 294 sections of fabric 295. The cross bars 293 are angular in cross sections and have welded, to the portion which is welded to the sprocket chains, outwardly projecting spaced tines 296 which are curved at their free ends in the direction of travel of the chains.

Figure 7:
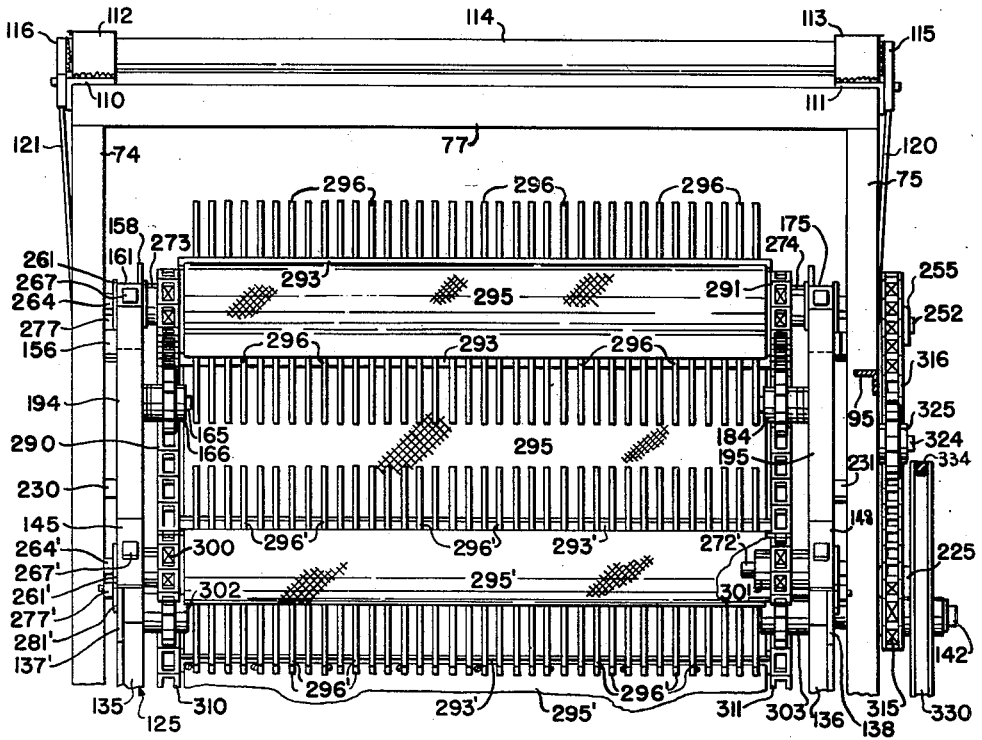
Figure 7 is a view taken along the line 7—7 in Figure 3 and showing in elevation the upper portion of one side of the apparatus as shown in Figure 3.
Figure 8:
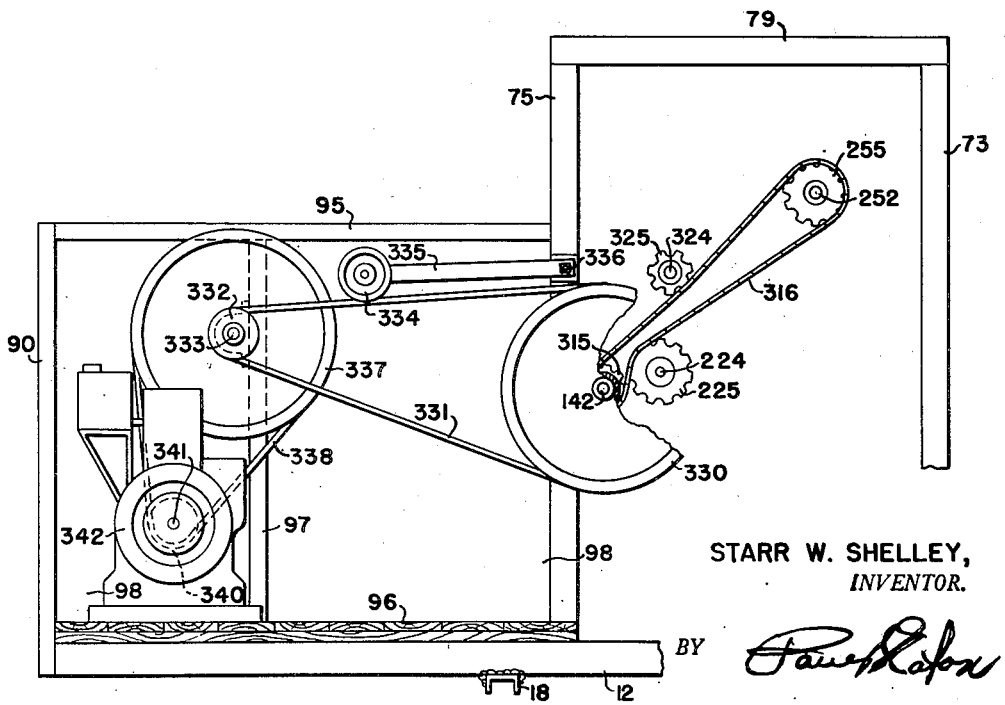
Figure 8 is a schematic view of the front left-hand portion of the apparatus as shown in Figure 1.
Figure 11:
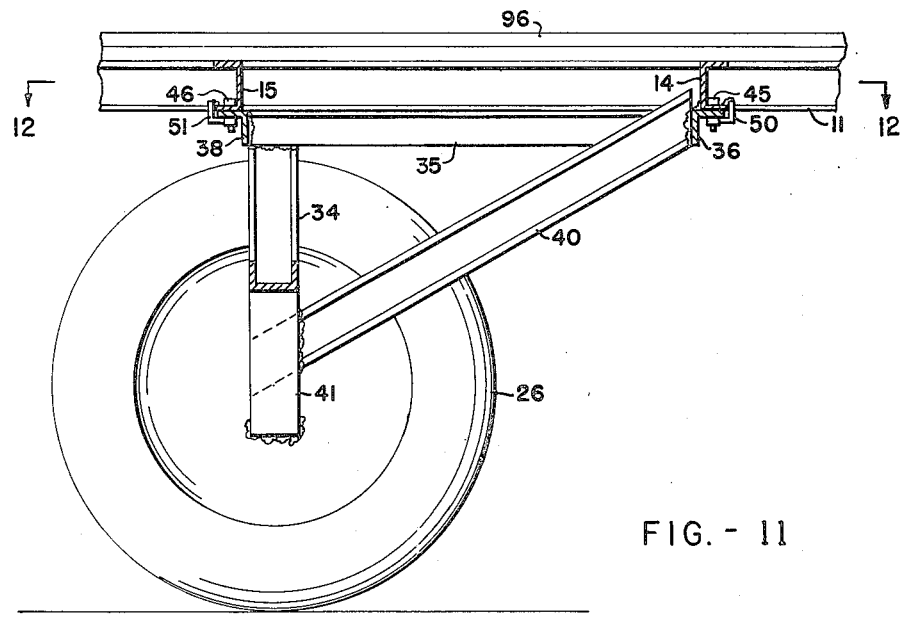
Figure 11 is a view taken substantially along the line 11—11 in Figure 1 and showing the means for securing one of the ground wheels to the framework, the other ground wheel being secured in like manner, except that the other wheel is not adjustable.
Figure 12:
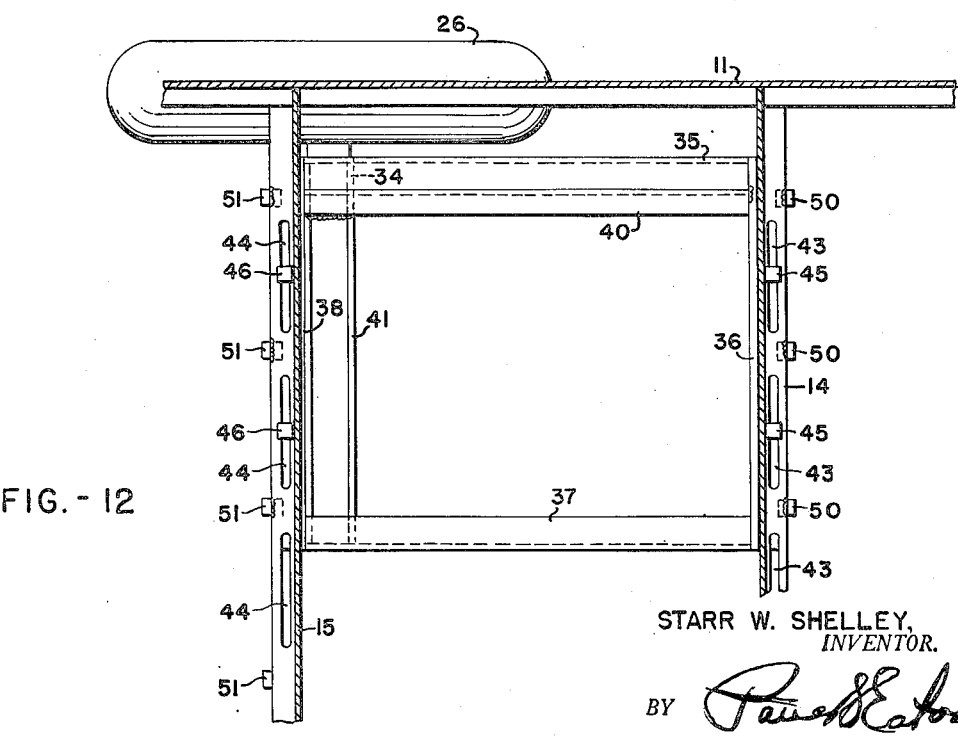
Figure 12 is a view taken substantially along the line 12—12 in Figure 11 and showing how the right-hand wheel in Figure 1 can be adjusted to vary the width and tread of the two wheels.

The angle bars 143 and 137 and 146 and 138 which have the slots 176 and 147 therebetween and which are bound together at their ends by the clips 145 and 148 respectively are identical in structure to the previously described structure associated with angle bars 158 and 154 and angle bars 174 and 176 respectively. Between these last named angle bars, namely, 143, 137 and 146 and 138 respectively is a bearing block assembly and adjusting assembly identical to that previously described for angle bars 158, 154 and 174 and 172 respectively and an additional description is not necessary as identical characters with prime notations added will be applied to the bearing block assembly and adjustment therefor associated with the bars 143, 137 and 146 and 138 respectively, and the bearing blocks 256' and 257' which are mounted in slots 144 and 147 have inwardly projecting stub shafts 271' and 272' welded thereto and on which idler sprockets 300 and 301 are rotatably mounted. The stub shaft 141 projects inwardly and the stub shaft 142 not only projects outwardly as previously described from frame 125 but also projects inwardly. Mounted on the proximate ends of stub shaft 141 and 142 are idler sprockets 302 and 303 respectively. See Figure 7.

Within the confines of frame 125 and fixedly secured on the shaft 224 are sprocket wheels 304 and 305. See Figure 5. On the stub shaft 202 and 203 near the lower left-hand portion of frame 125 when viewed from the front are rotatably mounted idler sprocket wheels 306 and 307. See Figure 6.

Mounted on the rear sprocket wheels 304, 300, 302 and 303 is a sprocket chain 310 and mounted on the front sprocket wheels 305, 301, 303 and 307 is a front sprocket chain 311. These sprocket chains 310 and 311 are identical in structure to the sprocket chains 290 and 291 and the laterally projecting lugs from certain of these links, the cross bars, the tines, and the fabric pieces all bear like reference characters with the prime notation added. Stub shaft 142 has rotatably mounted thereon an idler sprocket 315 on which is mounted a sprocket chain 316. The sprocket chain 316 also engages sprocket 225 and is mounted on sprocket wheel 255.

Figure 5:
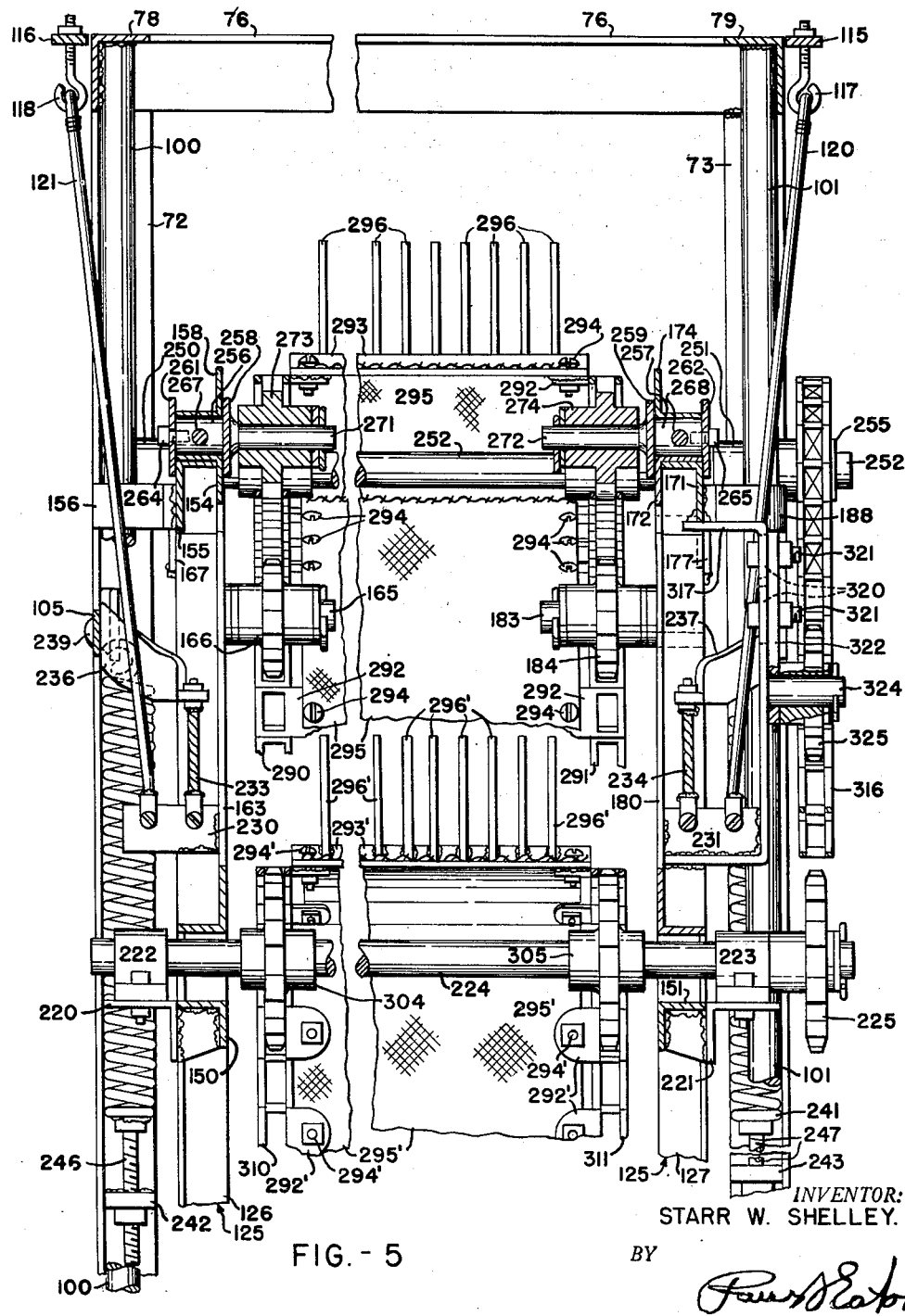
Figure 5 is a vertical sectional view taken substantially along the line 5—5 in Figure 3 with parts broken away and in section.

Welded to plate 231 and to angle bar 180 is a substantially U-shaped member 317 which projects upwardly and has its upper inturned leg welded to angle bar 171 (Figure 5). The vertically disposed portion of member 317 has a plurality of vertically disposed slots 320 therein in which are mounted bolts 321 so that it can be adjusted vertically and a plate 322 is disposed against the vertical portion of member 317 and has suitable holes therein penetrated by the bolts 321. The plate 322 has welded thereto and projecting outwardly therefrom a stub shaft 324 on which is mounted an idler sprocket 325 and, as explained, is vertically adjustable as a tightener sprocket for the sprocket chain 316.

Integral with sprocket 315 is a V-pulley 330 which has mounted thereon a V-belt 331 which is mounted on a smaller V-pulley 332 rotatably mounted on a stub shaft 333. The belt 331 is engaged by an idler pulley 334 mounted on the free end of an arm 335 pivotally secured as at 336 to the upright angle bar 75. Integral with V-pulley 332 is a larger V-pulley 337 which has mounted thereon a V-belt 338 which is mounted also on a V-pulley 340 which in turn is fixedly secured on a motor shaft 341 of a prime mover 342 which in the present instance is a small internal combustion engine.

In the drawings the various rows of cotton plants as well as the individual cotton plants are indicated at R whereas the bolls of cotton are indicated by the reference character B. This machine is adapted to traverse one row of cotton at a time and usually the plants of cotton are much spread out over a much wider space than the space left between the proximate edges of the guards 69 and 69' and the lower guards 63 and 63' but since the branches of the cotton plant project upwardly their free ends will be raised up and crowded between the fenders and then the tines 296 and 296' will pass upwardly through the cotton plants, and since the distance between the tines 296 is less than the smallest diameter of the cotton bolls, as these bolls will vary in size on particular plants, it means that the cotton bolls will be caught between the tines and the stems will be severed somewhere along their length to thus separate the bolls from the cotton plants. Since the right-hand elevator in Figure 3 runs in a clockwise manner and the left-hand elevator or endless chains run in a counter-clockwise manner, it is thus seen that the tines 296 and 296' which are moving upwardly vertically will be moving at the same rate of speed and with their ends in close proximity to each other. The cotton bolls will be carried upwardly and those on the tines 296' will be conveyed laterally at the upper end of the left-hand elevator chain in Figure 3 and will be dumped onto the floor 96. The bolls which are being elevated by the tines 296 on the right-hand elevator chain in Figure 3 will pass upwardly to a higher level and since the left-hand reach of this right-hand chain, Figure 3, will be directed laterally it will therefore dump all the cotton bolls downwardly onto the uprising tines 296' or onto the fabric sheets which are in horizontal position on the left-hand elevator mechanism. In any event, the bolls from both of the elevators will be transferred laterally and dumped onto the floor 96 of the framework on which this apparatus is mounted. It is of course evident that as the cotton bolls pile up underneath the left-hand end of the horizontal portion of the left-hand conveyor in Figure 3 that an operator will sweep the bolls backwardly and spread them out over the entire floor 96 until the bin formed by the walls 98 will be completely filled at which time the cotton bolls will be transferred from the machine or will be conveyed to a suitable fiber handling apparatus as set forth in my above referred to co-pending patent application where the bolls and other impurities will be removed from the cotton fibers.

When the apparatus is not engaged in the picking of cotton bolls it is of course necessary to raise it to elevated position for transport from place to place. This means that the vertically movable frame 125 will be raised which will take the skids 131 and 132 out of contact with the ground, and this will also raise the skids or shoes 62 and 62' and associated framework upwardly away from the ground due to the fact that the laterally projecting members 204 and 210 will pass beneath the side bars 58 and 58' which are pivoted at 59 and 59' and thus the shoes 62 and 62' and associated parts will be raised upwardly along with the vertically movable frame 125. This frame 125 is moved upwardly by downward pressure on lever 116a which through the links 120 and 121 will raise the frame 125 upwardly. The frame 125 can be held in elevated position during transport purposes by any suitable means, one means being an arcuate bar 345 having one end welded to the upright angle bar 74 and having a center which is the center of bearing box 112 and this bar 345 may have a plurality of holes 346 therethrough and a suitable pin 347 may be passed through one of the holes 346 in the bar 345 and through a hole in the lever 116a which will hold the frame 125 in elevated position. See Figure 4.

Another advantage of having the vertically movable frame 125 counterbalanced by the tension springs 240 and 241 is that a large part of the weight of the frame being carried by the springs 240 and 241 will make it move upwardly easily when the curved bars 129 and 134 or the skids 131 and 132 strike an obstruction like a rock or other elevation and thus the frame 125 can move upwardly much more easily than if the skids 131 and 132 were supporting the entire weight of the frame.

Attention is called to the fact that in case the curved members or shoes 62 and 62' should engage an obstruction or elevation, they can raise upwardly independently on their pivots 59 and 59' in advance of the frame 125 being raised upwardly by engaging such obstructions.

Attention is also called to the fact that the frame 125 is guided in its up-and-down movements by the two vertically disposed shafts 100 and 101 which as has been described have their ends anchored in the fixed frame having the four corner posts 72, 73, 74 and 75 and the intermediate portions thereof are slidably mounted in the bearing blocks 156 and 186 and bearing blocks 191 and 188 respectively, which are mounted on the vertically movable frame 125 as has previously been described.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In a cotton picker for severing cotton bolls from cotton plants, having a wheeled framework and a vertically disposed inverted U-shaped framework mounted in the wheeled framework, and having a pair of substantially vertically disposed endless conveyors mounted therein and said endless conveyors having a plurality of transverse spaced rows of closely spaced tines secured thereto and means for driving the conveyors so that their proximate sides move upwardly at the same rate of speed, and whereby a row of tines on one conveyor will move upwardly alongside a row of tines on the other conveyor, a laterally directed leg portion integral with the upper end of each of the conveyors, whereby the bolls will fall from the leg portions of the conveyors by gravity.

2. In a structure according to claim 1, a pair of vertically movable shields pivotally connected to the wheeled framework and being disposed forwardly of the lower ends of the endless conveyors, the shields having shoe members secured to the lower front ends thereof for engaging the ground over which the wheeled framework is adapted to be moved and whereby upon the shoes engaging an obstruction, the shields will pass over the obstruction and will be moved upwardly relative to the wheeled framework and will fall downwardly by gravity after passing over the obstruction and whereby the shields will guide the branches of the cotton plant between the proximate sides of the vertically disposed endless conveyors.

3. In a structure according to claim 1, means for resiliently supporting the vertically disposed framework in the wheeled framework comprising a fixed vertically disposed framework surrounding the first-named vertically disposed framework and being integral with the wheeled framework and the first-named vertically disposed framework being mounted for vertical sliding movement in the fixed framework, a lever pivotally secured intermediate its ends to the fixed vertically disposed framework, one end of said lever being connected to the first-named vertically disposed framework and spring means connecting the end of the lever remote from the end secured to the first-named vertically disposed framework to the fixed vertically disposed framework.

4. In a structure according to claim 3, manually operable means for raising the first-named vertically disposed framework and for locking the vertically disposed framework in an elevated position relative to the fixed vertically disposed framework comprising of a lever arm pivotally connected intermediate its ends to the upper end of the fixed vertically disposed framework, a connection between one end of the lever arm and the first-named vertically disposed framework, an arcuate member secured to the fixed vertically disposed framework and being disposed adjacent one side of the lever arm and having a plurality of bores therein and a removable pin mounted in the lever arm whereby the free end of the lever arm may be moved downwardly by an operator and the pin may be inserted through the lever arm and through any one of the bores in the arcuate member to thus retain the first-named vertically disposed framework in an elevated position relative to the fixed framework.

5. In an apparatus for separating cotton bolls from cotton plants comprising a wheeled framework, said wheeled framework having a vertically disposed framework therein and having a pair of substantially parallel and vertically disposed endless conveyors mounted therein, and means for driving the endless conveyors, and the said conveyors having laterally projecting tines secured thereto and projecting in close proximity to each other, said tines being arranged in horizontal spaced rows across the conveyors and having the outer ends of the tines on one conveyor in close proximity to the outer ends of the tines on the other conveyor, the tines being spaced from each other sufficiently to allow vegetation to pass therebetween but close enough to prevent a cotton boll from passing therebetween, the sets of tines on one conveyor occupying substantially the same elevation as corresponding sets of tines on the other conveyor as they move upwardly, each of the said vertically disposed conveyors at its top portion having a laterally directed leg, whereby when the apparatus is drawn along a row of cotton plants, the laterally projecting tines on the proximate reaches of the conveyors, will move upwardly through the cotton plants to engage and separate the bolls therefrom and whereby the tines will discharge their bolls from the conveyors.

6. In a cotton picker for severing cotton bolls from cotton plants, having a wheeled framework and a vertically disposed framework mounted in the wheeled framework, and having a pair of substantially vertically disposed endless conveyors mounted therein and said endless conveyors having a plurality of rows of closely spaced tines secured thereto, said tines being arranged in horizontal spaced rows across the outer ends of the tines on one conveyor in close proximity to the outer ends of the tines on the other conveyor, the tines being spaced from each other sufficiently to allow vegetation to pass therebetween, but close enough to prevent a cotton boll from passing therebetween, the sets of tines on one conveyor occupying substantially the same elevation as corresponding sets of tines on the other conveyor as they move upwardly, and means for driving the conveyors so that their proximate sides move upwardly at the same rate of speed and a laterally directed conveyor portion integral with each of the conveyors.

7. In a cotton picker for severing cotton bolls from cotton plants having a wheeled framework and having a pair of substantially vertically disposed endless conveyors mounted therein, the said endless conveyors having a plurality of closely spaced tines secured thereto and means for driving the conveyors so that their proximate sides move upwardly at the same rate of speed, a vertically movable frame mounted in the wheeled framework and in which the conveyors are mounted, means for resiliently mounting the vertically movable frame in the wheeled framework and manually operable means for raising the vertically movable framework relative to the wheeled frame, said vertically movable framework being adapted to move downwardly by gravity when permitted by the manually operable means for raising the same, an additional means for locking the vertically movable framework in adjusted position relative to the framework, the lower end of the vertically movable frame having skids thereon which are adapted to engage the ground over which the wheeled framework is adapted to be moved and whereby, upon the skids engaging an obstruction, such as a rock, the vertically movable frame will bounce upwardly due to its resilient mounting.

STARR W. SHELLEY.

REFERENCES CITED

The following references are of record in the file of this patent:

UNITED STATES PATENTS

| Number | Name | Date |
|---|---|---|
| 286,055 | Myers et al. | Oct. 2, 1883 |
| 794,265 | Watson | July 11, 1905 |
| 1,147,961 | Matlock | July 27, 1915 |
| 1,195,030 | Keeling | Aug. 15, 1916 |
| 1,664,924 | Helton | Apr. 3, 1928 |
| 1,700,926 | Dykes | Feb. 5, 1929 |
| 1,740,274 | Speck | Dec. 17, 1929 |
| 1,750,536 | McDonald | Mar. 11, 1930 |
| 1,763,646 | Callahan | June 17, 1930 |